United States Patent
Golan et al.

(10) Patent No.: US 10,791,144 B1
(45) Date of Patent: Sep. 29, 2020

(54) CONTAINER LIFE CYCLE MANAGEMENT WITH HONEYPOT SERVICE

(71) Applicant: EMC IP Holding Company LLC, Hopkinton, MA (US)

(72) Inventors: Oron Golan, Meitar (IL); Raul Shnier, Ruhama (IL); Aviram Fireberger, Mavki'im (IL); Amos Zamir, Be'er Sheva (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 60 days.

(21) Appl. No.: 15/797,597

(22) Filed: Oct. 30, 2017

(51) Int. Cl.
*H04L 29/06* (2006.01)

(52) U.S. Cl.
CPC ...... *H04L 63/1491* (2013.01); *H04L 63/1425* (2013.01)

(58) Field of Classification Search
CPC .................. H04L 63/1491; H04L 63/1425
See application file for complete search history.

(56) References Cited

U.S. PATENT DOCUMENTS

| | | | | |
|---|---|---|---|---|
| 8,438,342 B1 * | 5/2013 | Todd | ...................... | G06F 3/0605 711/108 |
| 9,009,829 B2 * | 4/2015 | Stolfo | ................... | G06F 21/554 726/23 |
| 10,007,509 B1 | 6/2018 | Qureshi et al. | | |
| 10,333,951 B1 * | 6/2019 | Natanzon | ............ | H04L 63/1425 |
| 2005/0166072 A1 * | 7/2005 | Converse | ............ | H04L 63/1441 726/5 |
| 2007/0044142 A1 * | 2/2007 | Yoon | .................... | H04L 63/0254 726/3 |
| 2014/0181974 A1 | 6/2014 | Yablokov et al. | | |
| 2015/0327173 A1 * | 11/2015 | Yae | .................... | H04W 52/0251 455/41.2 |
| 2016/0323301 A1 * | 11/2016 | Boss | .................... | H04L 63/1416 |
| 2017/0093923 A1 | 3/2017 | Duan | | |
| 2017/0223036 A1 | 8/2017 | Muddu et al. | | |
| 2018/0255075 A1 | 9/2018 | Brugger et al. | | |
| 2018/0331951 A1 | 11/2018 | Boutros et al. | | |

(Continued)

OTHER PUBLICATIONS

R.C.Joshi, A Honeypot System for Efficient Capture and Analysis of Network Attack Traffic, 2011, IEEE Proceedings of 2011 International Conference on Signal Processing, Communication, Computing and Networking Technologies (ICSCCN 2011) (Year: 2011).*

(Continued)

*Primary Examiner* — Michael Simitoski
*Assistant Examiner* — Tarek Elarabi
(74) *Attorney, Agent, or Firm* — Ryan, Mason & Lewis, LLP (57) ABSTRACT

The life cycle of one or more containers related to one or more containerized applications is managed by determining that a predefined retention time for a first container of the plurality of containers has elapsed; in response to the determining, performing the following honeypot container creation steps: suspending new session traffic to the first container; maintaining the first container as a honeypot container; and identifying communications sent to the honeypot container as an anomalous communication. Alert notifications are optionally generated for the anomalous communication.

20 Claims, 10 Drawing Sheets

(56) References Cited

U.S. PATENT DOCUMENTS

| | | |
|---|---|---|
| 2019/0020683 A1* | 1/2019 | Haerterich .......... H04L 63/1491 |
| 2019/0052675 A1 | 2/2019 | Krebs |
| 2019/0068640 A1* | 2/2019 | Araujo ................ H04L 63/1491 |
| 2019/0095236 A1 | 3/2019 | Felter et al. |
| 2019/0104104 A1 | 4/2019 | Kapadia et al. |

OTHER PUBLICATIONS

Ciprian Răcuciu, Honeypot System Based on Software Containers, 2015, "Mircea cel Batran" Naval Academy Scientific Bulletin, vol. XIX—2016—Issue 2 DOI: 10.21279/1454-864X-16-I2-062 (Year: 2015).*

"Eliminate Zero-Day Cyberattacks", downloaded from https://polyverse.io/ on Oct. 27, 2017.

U.S. Appl. No. 15/664,719, entitled "Method and System for Implementing Golden Container Storage", filed Jul. 31, 2017.

U.S. Appl. No. 15/797,609, entitled "Container Life Cycle Management with Session Dilution Time", filed Oct. 30, 2017.

U.S. Appl. No. 15/797,601, entitled "Container Life Cycle Management with Retention Rate Adjustment Based on Detected Anomalies", filed Oct. 30, 2017.

* cited by examiner

CONTAINER LIFE CYCLE MANAGEMENT WITH HONEYPOT SERVICE

CROSS-REFERENCE TO RELATED APPLICATION

The present application is related to U.S. patent application Ser. No. 15/797,609, entitled "Container Life Cycle Management With Session Dilution Time;" and U.S. patent application Ser. No. 15/797,601, entitled "Container Life Cycle Management With Retention Rate Adjustment Based On Detected Anomalies," each filed contemporaneously herewith and incorporated by reference herein in their entirety.

FIELD

The field relates generally to managing the life cycle of containers related to one or more containerized applications.

BACKGROUND

The static nature of existing computing systems strengthens the susceptibility of the computing systems to malicious attacks and/or unauthorized access. The United States Department of Homeland Security defines Moving Target Defense (MTD) as "the concept of controlling change across multiple system dimensions in order to increase uncertainty and apparent complexity for attackers, reduce their window of opportunity and increase the costs of their probing and attack efforts."

Honeypots are computer security mechanisms that detect and/or counteract unauthorized attempts to access computer systems or other protected resources.

A need exists for Moving Target Defense techniques that incorporate Honeypots.

SUMMARY

In one embodiment, a method is provided for managing the life cycle of containers related to one or more containerized applications. The exemplary method comprises determining that a predefined retention time for a first container of the plurality of containers has elapsed; in response to the determining, performing the following honeypot container creation steps, using at least one processing device: suspending new session traffic to the first container; maintaining the first container as a honeypot container; and identifying communications sent to the honeypot container as an anomalous communication. Alert notifications are optionally generated for the anomalous communication.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for managing the life cycle of containers related to one or more containerized applications.

In one or more embodiments, methods and systems are provided for implementing golden container storage using a session dilution time that allows existing sessions to complete before a given container is disconnected from a service platform. Specifically, one or more embodiments of the disclosure entail the creation of a container registry to securely store golden containers (or templates) for containers of specific application types that execute within a service platform. Given short retention spans, the containers are constantly being cycled out. Each recreated container is modeled after one of the golden containers, and assigned new Internet Protocol (IP) and/or media access control (MAC) addresses rather than assuming the existing addresses of the containers that the recreated containers are replacing. Substantively, embodiments of the disclosure employ these tactics towards implementing a moving target defense (MTD) strategy.

In some embodiments, after a predefined retention time for a given container has elapsed, any new session traffic to the given container is suspended and the given container is maintained as a honeypot container. Thereafter, any communications sent to the honeypot container can be identified as anomalous communications.

Figure 1:
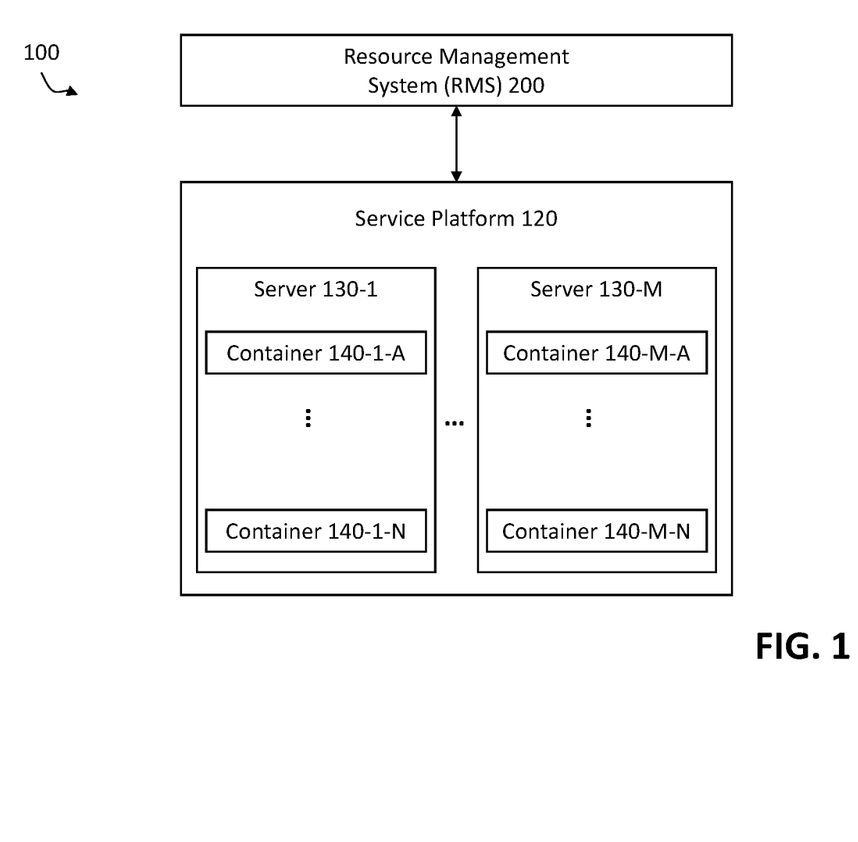
FIG. 1 illustrates an exemplary system, according to one or more embodiments of the disclosure.

FIG. 1 illustrates an exemplary system 100, according to one or more embodiments of the disclosure. The system 100 includes a resource management system (RMS) 200 operatively connected to a service platform 120. In one embodiment of the disclosure, the RMS 200 and the service platform 120 may be directly or indirectly connected to one another through a network (e.g., a local area network (LAN), a wide area network (WAN) such as the Internet, a mobile network, or any other type of network). In embodiments where the RMS 200 and the service platform 120 are indirectly connected, there may be other networking components or systems (e.g., switches, routers, gateways, etc.) (not shown) that facilitate communication and/or information exchange. Further, the RMS 200 and the service platform 120 may communicate with one another using any combination of wired and/or wireless communication connections and/or protocols.

In at least one embodiment of the disclosure, the RMS 200 may be a platform for the centralized management and deployment of containers in the service platform 120. The RMS 200 may be implemented on a physical server (e.g., in a data center) or on a virtual server that may be cloud-based. Further, the RMS 200 may be implemented on a single server, or alternatively, on multiple servers that may be physical, virtual, or a combination thereof. In one embodiment of the disclosure, the RMS 200 may be implemented on one or more computing systems similar to the exemplary computing system shown in FIG. 6. The RMS 200 is described in further detail below with respect to FIG. 2.

In one embodiment of the disclosure, the service platform 120 may be a hardware and/or software implemented environment for the deployment of services and resources. The service platform 120 may be implemented on one or more servers 130-1 through 130-M. Each server 130 may be a physical server or a virtual server that may be cloud-based. In one embodiment of the disclosure, each server 130 may be a computing system similar to the exemplary computing system discussed further below in conjunction with FIG. 9. Further, each server 130 may be any computing system that may be programmed to receive requests, process requests, and based on the processing of requests, extend services and/or resources to client computing systems (not shown). Examples of types of servers include, but are not limited to, virtualized servers, database servers, application servers, print servers, and mail servers.

In one embodiment of the disclosure, each server 130 may be further programmed to provide computing resources to support the implementation and functionalities of a set of containers 140-1-A through 140-M-N. A container 140 may be an isolated, lightweight virtualization mechanism (or software construct) that allows for the running of an application or an operating system within the container 140 without the overhead of executing a hypervisor (as is needed for executing virtual machines on underlying hardware). Minimal overhead may be generated by containers 140 because: (i) containers 140 share the same operating system kernel with other containers 140 and the underlying host (e.g., a server 130); and (ii) containers 140 (unlike virtual machines) do not need to emulate physical hardware. Further, in one embodiment of the disclosure, a container 140 may be implemented virtually by a host operating system.

In one embodiment of the disclosure, the set of containers 140-1-A through 140-M-N may be segmented into one or more pods (not shown). Specifically, each pod may include a subset (ss) of the set of containers 140-1-A through 140-M-N. In one embodiment of the disclosure, the aforementioned subset of containers 140-ss may be co-located in the same server (e.g., 130-1). In another embodiment of the disclosure, the aforementioned subset of containers 140-ss may be executing on multiple servers 130-1 through 130-M of the service platform 120. Furthermore, the subset of containers 140-ss in each pod may work together towards implementing a service. Subsequently, each container 140 in a pod may be assigned an application type, and thus, include functionalities conforming to their assigned application type. The application type that may be assigned to a container 140 may include, but is not limited to, a front-end application type, a back-end application type, and a database application type.

In one embodiment of the disclosure, a front-end (fe) application type container 140-fe may be representative of server computing resources dedicated towards facilitating the interaction between a service and a user, or a service and another service. Specifically, a front-end application type container 140-fe may include functionality to: (i) provide a specification for how the interaction and/or exchange of information should take place between the service and a user or other service; (ii) receive input (i.e., data, requests, etc.), conforming to the aforementioned specification, from a user or other service; and (iii) provide output (i.e., processed data, responses, resources, etc.), conforming to the aforementioned specification, to a user or other service. By way of example, a front-end application type container 140-fe may implement at least a portion of a command line interface (CLI), a graphical user interface (GUI), an application program interface (API), a web-based user interface (WUI), a natural language interface, or any combination thereof.

In one embodiment of the disclosure, a back-end (be) application type container 140-be may be representative of server computing resources dedicated towards implementing the functional logic and operations supporting a service. Specifically, a back-end application type container 140-be may include functionality to: (i) validate received input from a user or other service; (ii) maintain service-wide security operations; (iii) communicate with external hosts to retrieve additional information; and (iv) process (i.e., execute algorithms on) the received input and additional information, if any, to generate output. By way of example, a back-end application type container 140-be may implement at least a portion of a data processing algorithm, a validation rule, an internet security suite, a web-service (i.e., technology that allows services/applications to communicate with each other), etc.

In one embodiment of the disclosure, a database (db) application type container 140-db may be representative of server computer resources dedicated towards the management of information. Specifically, a database application type container 140-db may include functionality to: (i) track and administer information generated, stored, and/or used by the service; (ii) maintain a schema (i.e. logical structure) for the information; (iii) monitor information storage and retrieval performance; and (iv) encode information through the application of, for example, encryption, compression, deduplication, and other data transforming operations. By way of example, a database application type container 140-db may implement at least a portion of database management system (DBMS), an encryption, compression, deduplication, etc., algorithm, a query-response system (QRS), etc.

While containers throughout the disclosure may host applications, and thus, may be associated with application types, as described above, one of ordinary skill in the art will appreciate that containers can host other constructs without departing from the scope of the disclosure. For example, in one embodiment of the disclosure, a container 140 may alternatively host a micro-service, which may structure an application as a collection of coupled services. In another embodiment of the disclosure, a container 140 may alternatively host a web server, and thereby include functionality to store, process, and/or deliver web resources to one or more clients (not shown). In yet another embodiment of the disclosure, a container 140 may alternatively host a monitoring tool for the surveilling of, for example, web resources, servers, networks, and/or application performance and reliability.

Figure 2:
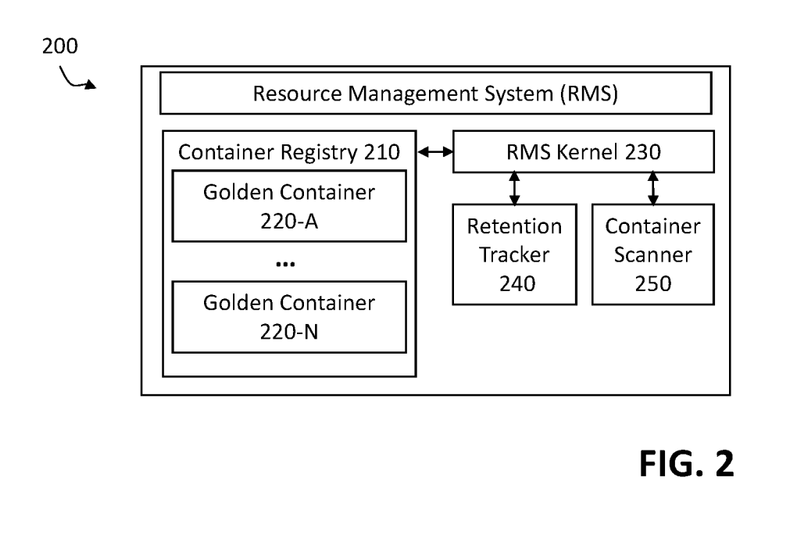
FIG. 2 illustrates the container management system of FIG. 1, in further detail, according to an embodiment of the disclosure.

FIG. 2 illustrates the container management system 200 of FIG. 1, in further detail, according to an embodiment of the disclosure. The RMS 200 includes an RMS kernel 230 operatively connected to a container registry 210, a retention tracker 240, and a container scanner 250. Each of these components is described below.

In one embodiment of the disclosure, the RMS kernel 230 may be a core application or computer program (e.g., an operating system) executing on the underlying hardware (e.g., one or more integrated circuits) of the RMS 200. The RMS kernel 230 may include functionality to: (i) generate, store, and retrieve golden containers (described below); (ii) create containers based on a golden container of the same application type; (iii) delete or reassign containers as honeypots; (iv) generate and feed emulated network traffic to honeypot containers; (v) submit scan requests to, and receive scan responses from, the container scanner 250; and (vi) submit track requests to, and receive elapse notifications from, the retention tracker 240. One of ordinary skill in the art will appreciate that the RMS kernel 230 may include other functionalities without departing from the scope of the disclosure.

In one embodiment of the disclosure, the container registry 210 may be a secure repository for storing one or more golden containers 220-A through 220-N. The container registry 210 may be segmented into one or more logical partitions (not shown), whereby each logical partition may be reserved to store golden containers 220-A through 220-N for a particular service implemented on the service platform. The container registry 210 may be implemented using any type of storage unit and/or device (e.g., a file system, a database, a collection of tables, or any other storage mechanism). Further, the container registry 210 may be implemented using multiple storage units and/or devices, which may or may not be of the same type or located at the same physical site. In one embodiment of the disclosure, the container registry 210 may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

In one embodiment of the disclosure, a golden container 220 may be a template for all containers of a specific application type that implement at least a portion of a service deployed through the service platform. Specifically, a golden container 220 may be a version (i.e., snapshot at a given time) of a cloned container belonging to a specific application type and used in the implementation of a service. Further, a golden container 220 may be used as a template for the generation of new containers of that specific application type towards implementing at least a portion of the service. As mentioned above, a container (and subsequently, a golden container 220) may be associated with a front-end application type, a back-end application type, or a database application type. In one embodiment of the disclosure, a golden container 220 may include all the libraries, tools, and software needed to support the functionalities and/or responsibilities of a container assigned to their specific application type and towards implementing at least their portion of a service. Further, in one embodiment of the disclosure, a golden container 220 may also be referred to as a golden image or a master image/container.

In one embodiment of the disclosure, the retention tracker 240 may be a computer process (or an instance of a computer program) executing on the RMS 200. Specifically, the retention tracker 240 may be a computer process dedicated towards the management of container retention times. A container retention time may refer to a duration of time (e.g., minutes, hours, etc.) specifying the lifespan of a container executing on the service platform. In one embodiment of the disclosure, the retention tracker 240 may include functionality to: (i) receive track requests from the RMS kernel 230; (ii) in response to receiving track requests, initialize and track the retention time for one or more containers actively executing on the service platform; and (iii) when a retention time for a container elapses, plus any predefined session dilution time, generate and transmit an elapse notification to the RMS kernel 230.

In one embodiment of the disclosure, the container scanner 250 may be a computer process (or an instance of a computer program) executing on the RMS 200. Specifically, the container scanner 250 may be a computer process dedicated towards the validation of containers. Validation of a container may refer to determining whether the container includes computer readable program code consistent with malicious activity, and/or whether the container exhibits anomalous behavior. Thus, in one embodiment of the disclosure, the container scanner 250 may include functionality to: (i) maintain and update a library of digital signatures (e.g., patterns of data) unique to one or more known cyber threats and/or attacks; (ii) generate models of the intended behavior (e.g., normal operation) of one or more containers executing on the service platform; (iii) receive scan requests from the RMS kernel 230 specifying container IDs; (iv) in response to receiving scan requests, subject containers to one or more misuse and/or anomaly detection algorithms; (v) based on a matching of at least one known digital signature to at least a portion of a container, determining that the container is contaminated; (vi) based on at least one deviation from a model exhibited by an active container, determining that the container is contaminated; (vii) based on not one match to a known digital signature to at least a portion of a container and based on observing no deviations in behavior exhibited by a container with respect to a model of the container, determining that the container is clean; and (viii) generate and provide scan responses, to the RMS kernel 230, including the results of the validation process (e.g., that a container is clean, or alternatively, that a container is contaminated).

For a further discussion of golden containers 200 and container registries 210, see, for example, U.S. patent application Ser. No. 15/664,719 (now U.S. Pat. No. 10,333,951), filed on Jul. 31, 2017, entitled "Method and System for Implementing Golden Container Storage," incorporated by reference herein in its entirety.

It is noted that container registry 210 may be implemented, at least in part, using the Docker hub container registry, from Docker, Inc. In one or more embodiments, a Kubernetes Container Orchestration Engine (COE) (see, e.g., https://kubernetes.io/) may be employed to automate deployment, scaling, and management of the containerized applications.

Figure 3:
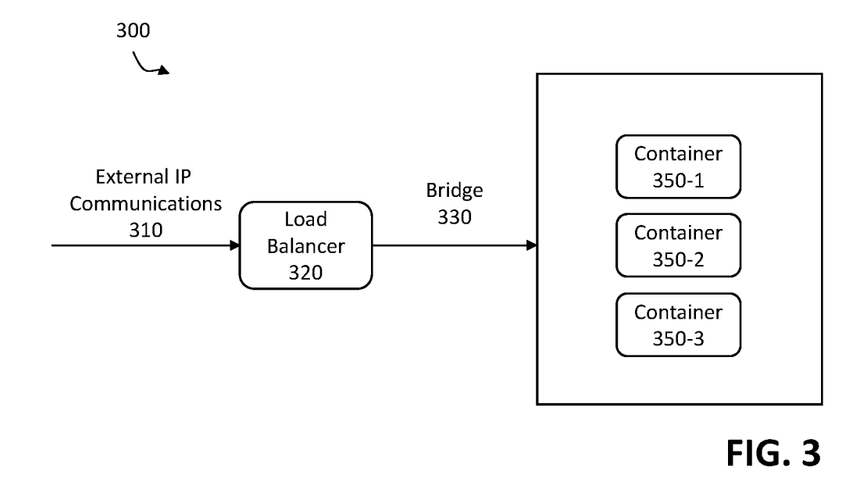
FIG. 3 illustrates an exemplary container environment, according to some embodiments of the disclosure.

FIG. 3 illustrates an exemplary container environment 300, according to some embodiments of the disclosure. In the exemplary embodiment of FIG. 3, a web service is deployed to three containers 350-1 through 350-3. The containers 350-1 through 350-3 each have a unique IP address, and provide a service to a load balancer 320. It is typically desirable to load balance between the containers 350-1 through 350-3, for example, using a proxy or a load balancer.

In the example of FIG. 3, load balancer 320 receives external IP communications 310 for the service and load balances the traffic for the service among containers 350-1 through 350-3, using a bridge 330. It noted that only front-end application type containers 140-fe are expected to have external IP communications 310.

In one or more embodiments, the load balancer 320 may be implemented, for example, as a Google load balancer or a Microsoft Azure load balancer.

Figure 4:
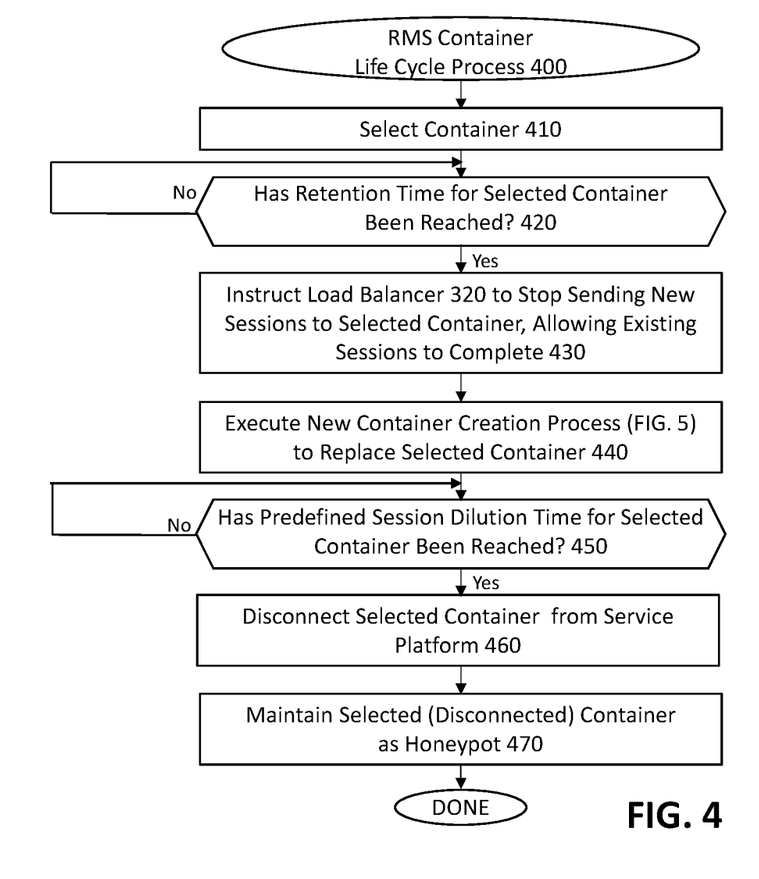
FIG. 4 is a flow chart illustrating an exemplary implementation of an RMS (Resource Management System) container life cycle process, according to one embodiment of the disclosure.

FIG. 4 is a flow chart illustrating an exemplary implementation of an RMS (Resource Management System) container life cycle process 400, according to one embodiment of the disclosure. As shown in FIG. 4, the RMS kernel 230 (e.g., executing the exemplary RMS container life cycle process 400 on the RMS 200 of FIG. 2) initially selects a container 140 during step 410. In one embodiment of the disclosure, the selected container 140 may be one of the one or more actively executing containers of a specific application type for a service implemented on the service platform. Further, selection of the container may be based on an updating schedule configured into the RMS 200. The updating schedule may specify periodic times (e.g., days of the week, hours or minutes of the day, etc.) during which golden containers 220 implementing each service deployed on the service platform 120 are to be generated/updated.

A test is performed during step 420 to determine, e.g., by the retention tracker 240 on the RMS 200 of FIG. 2, if the predefined retention time for the selected container 140 has been reached. In one embodiment of the disclosure, the selected container 140 may be an actively executing container 140 that implements at least a portion of a service deployed on the service platform 120. Further, as described above, a container retention time refers to a duration of time specifying the configured lifespan of the container 140.

If it is determined during step 420 that the predefined retention time for the selected container 140 has not been reached, then program control returns to step 420. In one or more embodiments, the retention tracker 240 resumes monitoring the predefined retention times of all containers 140 executing on the service platform 120 until another determination may be made.

Once it is determined during step 420 that the predefined retention time for the selected container 140 has been reached, then the exemplary RMS container life cycle process 400 instructs the load balancer 320 to stop sending new sessions to the selected container 140, allowing existing sessions to complete in accordance with one or more aspects of the disclosure, during step 430. In one or more embodiments, the retention tracker 240 issues an elapse notification during step 430 to the RMS kernel 230. The elapse notification may include, for example, a container identifier that uniquely identifies the container 140 associated with the elapsed retention time (e.g., the old container). Thereafter, in response to receiving the elapse notification, the RMS kernel 230 obtains a golden container 220 from the container registry 210, as discussed further below in conjunction with FIG. 5.

The exemplary RMS container life cycle process 400 then initiates execution of a new container creation process 500, as discussed further below in conjunction with FIG. 5, to replace the selected container 140 during step 440.

A test is performed during step 450 to determine if the predefined session dilution time for the selected container 140 has been reached (that has been selected to allow existing sessions to complete). If it is determined during step 450 that the predefined session dilution time for the selected container 140 has not been reached, then program control returns to step 450. Once it is determined during step 450 that the predefined session dilution time for the selected container 140 has been reached, then the selected container 140 is disconnected from the service platform 120 during step 460 and is then maintained as a Honeypot during step 470. The duration of the existence of the Honeypot is optionally set by the customer.

The RMS kernel 230 optionally generates emulated (e.g., fake) network traffic, and subsequently, feeds the emulated network traffic to the Honeypot during step 470. In one embodiment of the disclosure, the emulated network traffic may include the simulation of interactions particular to the associated application type of the selected container that, under normal operations, may occur between the selected container and other components. For example, if the Honeypot container was a front-end application type container, the emulated network traffic may include simulated server-client transfers, which may be implemented through a looping of a batch request for resources transmitted to the selected container.

During step 470, while generating/feeding the emulated network traffic to the Honeypot, the RMS kernel 230 maintains and monitors the selected container 140 as a Honeypot. In one embodiment of the disclosure, a Honeypot container may be a decoy container utilized for trapping (e.g., engaging and deceiving) hackers and/or attackers. By luring in and trapping such malicious or anomalous users, a Honeypot container may be employed to study the activities of the trapped user(s) in order to track and identify how hackers and/or attackers intrude and/or infect a container 140 (e.g., the selected container 140). Furthermore, by studying these aforementioned hacker activities, countermeasures may be developed to better protect the container, the service, and/or the service platform from future unauthorized activities.

Figure 5:
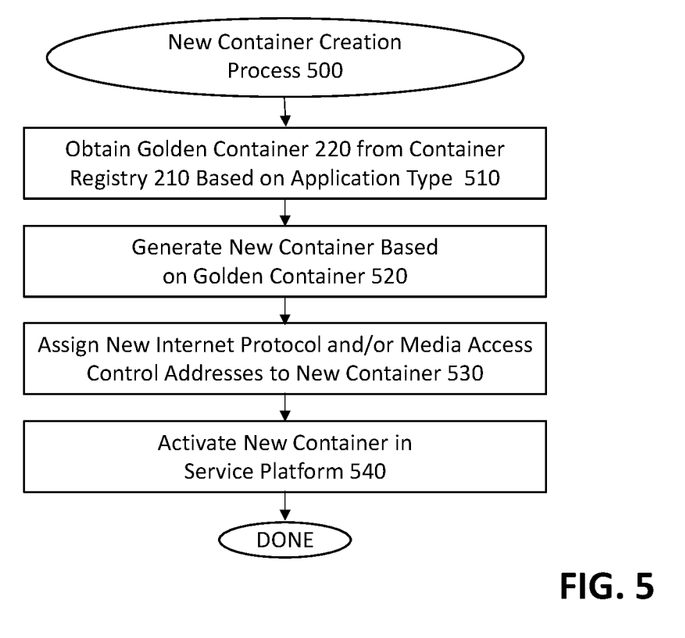
FIG. 5 is a flow chart illustrating an exemplary implementation of a new container creation process, according to one embodiment of the disclosure.

FIG. 5 is a flow chart illustrating an exemplary implementation of a new container creation process 500, according to one embodiment of the disclosure. As shown in FIG. 5, the exemplary new container creation process 500 initially obtains a golden container 220 from the container registry 210 during step 510, e.g., based on the application type. Thus, in an embodiment of the disclosure, the golden container 220 obtained from the container registry 210 may be of the same application type as the old container (e.g., selected container 140). More specifically, the obtained golden container 220 may be retrieved from a logical partition reserved for the specific service the old container is or has been, at least in part, implementing.

During Step 520, the RMS kernel 230 generates a new container, based on the obtained golden container 220. In one embodiment of the disclosure, the RMS kernel 230 may generate the new container 140 based on the template outlined by the golden container 220 (obtained in step 510). The new container may be generated as a substitute for the old container, whose predefined retention time had elapsed through a determination performed in step 420, and accordingly, may be associated with the same application type as the old container and the golden container.

During step 530, the RMS kernel 230 assigns an Internet Protocol (IP) address to the new container (generated in step 520). In one embodiment of the disclosure, a new IP address is assigned rather than transferring the existing IP address associated with the old container to the new container. In one embodiment of the disclosure, a new IP address may be assigned to the new container as an MTD measure (described above). In another embodiment of the disclosure, the RMS kernel 230 may further assign a media access control (MAC) address to the new container. The MAC address may be a new MAC address rather than the existing MAC address associated with the old container. Similarly, the new MAC address may be assigned to the new container as another MTD measure.

The new container is then activated in the service platform 120 during step 540. For example, the RMS kernel 230 can connect the new container into the service platform 120. Specifically, in one embodiment of the disclosure, the new container may be directed to a pod on the service platform 120 that implements the service that the old container may be, at least in part, implementing. At this point, the new container replaces the old container, thereby assuming one or more functionalities of the service, which may have been implemented by the old container.

After connecting the new container during step 540, program control returns to the RMS container life cycle process 400 and the RMS kernel 230 disconnects the old container from the service platform 120 during step 460. Specifically, in one embodiment of the disclosure, the old container may be deleted, leading to the deallocation of server computing resources expended towards implementing the old container.

Figure 6:
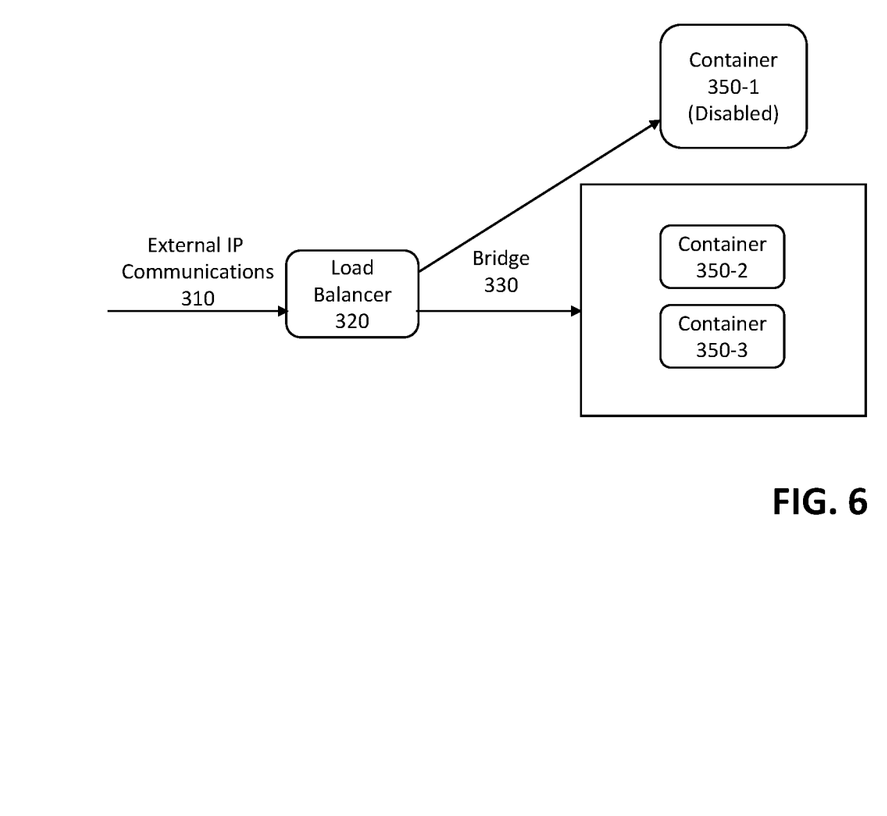
FIGS. 6 and 7 illustrate various stages in the life cycle of a container according to an embodiment of the disclosure.

FIG. 6 illustrates container 350-1 of FIG. 3, during the predefined session dilution time of the container 350-1, according to an embodiment of the disclosure. As noted above, the session dilution time has been selected to allow existing sessions to finish before the container 350-1 is disconnected from the service platform 120. Thus, as shown in FIG. 6, the load balancer 320 sets the container 350-1 to a disabled status, such that the existing sessions will be processed, but the load balancer 320 will not send any new sessions to the disabled container 350-1.

Thus, when load balancer 320 receives new external IP communications 310 for the service the load balancer 320 will load balance the new session traffic for the service only among containers 350-2 and 350-3, using bridge 330, until a new container is activated to replace the disabled container 350-1.

Figure 7:
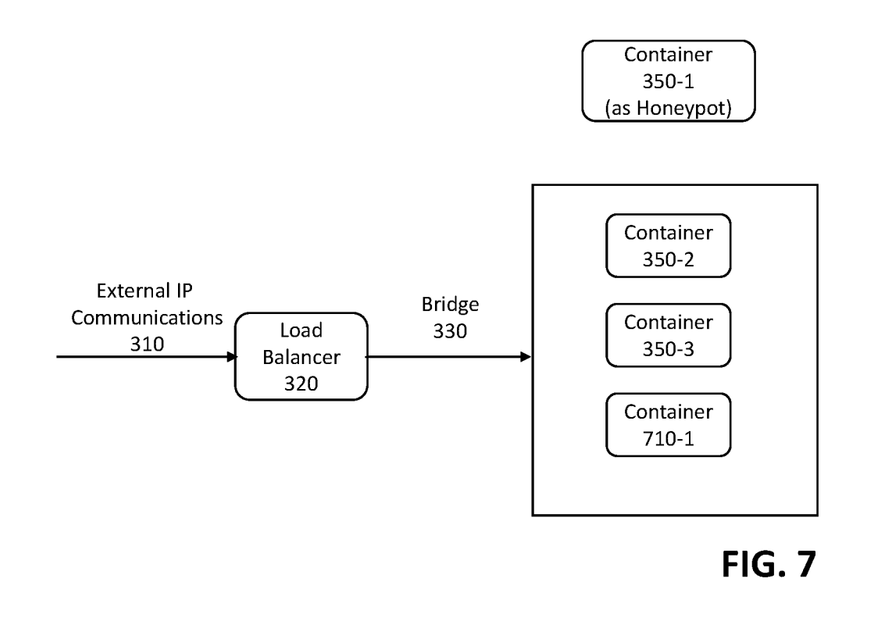

FIG. 7 illustrates container 350-1 of FIG. 3, during the Honeypot role of the container 350-1, according to an embodiment of the disclosure. In one or more embodiments, once the load balancer 320 sets the container 350-1 to the disabled status, as discussed above in conjunction with FIG. 6, the load balancer 320 will not send any new sessions to the disabled container 350-1. Thus, no session traffic should be sent to the disabled container 350-1, and any traffic to the disabled container 350-1 (now in the role of a Honeypot according to step 470 of the RMS container life cycle process 400) is considered malicious or anomalous traffic.

Thus, while the RMS kernel 230 is maintaining and monitoring the container 350-1 as a Honeypot, and the RMS kernel 230 detects traffic being sent to the disabled container 350-1, the RMS kernel 230 raises an alert because there should not be any communications to the container 350-1. Such malicious or anomalous traffic would be sent to the disabled container 350-1 (now a Honeypot) through a routing table, or a Web Application Firewall (WAF).

CONCLUSION

One or more embodiments of the disclosure provide methods and apparatus for managing the life cycle of containers related to one or more containerized applications. In one or more embodiments, methods and systems are provided for implementing golden container storage using a session dilution time that allows existing sessions to complete before a given container is disconnected from a service platform. In this manner, the disclosed container life cycle management techniques can be used for session-based applications.

In some embodiments, after a predefined retention time for a given container has elapsed, any new session traffic to the given container is suspended and the given container is maintained as a honeypot container. Thereafter, any communications sent to the honeypot container can be identified as anomalous communications. Alert notifications can optionally be generated regarding the anomalous communications.

The foregoing applications and associated embodiments should be considered as illustrative only, and numerous other embodiments can be configured using the techniques disclosed herein, in a wide variety of different applications.

It should also be understood that the disclosed techniques for container life cycle management, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for container life cycle management may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a container life cycle management system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a container life cycle management platform in illustrative embodiments. The cloud-based systems can include object stores such as Amazon S3, GCP Cloud Storage, and Microsoft Azure Blob Storage.

As noted above, the container registry 210 may be implemented, at least in part, using the Docker hub container registry, from Docker, Inc.; and in one or more embodiments, the Kubernetes Container Orchestration Engine (COE) (see, e.g., https://kubernetes.io/) may be employed to automate deployment, scaling, and management of the containerized applications.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the container life cycle management devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 through 10. These platforms may also be used to implement at least portions of other information processing systems in other embodiments.

Figure 8:
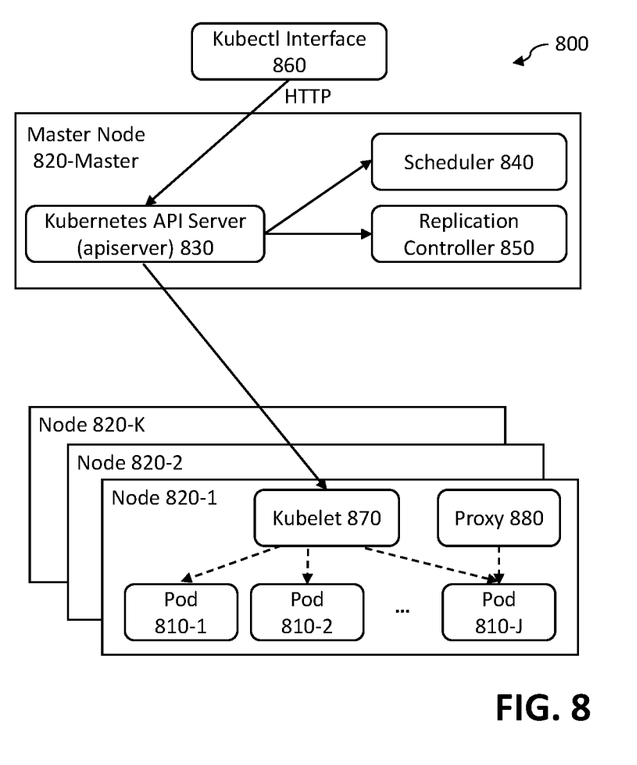
FIG. 8 illustrates an exemplary Kubernetes processing platform that may be used to implement at least a portion of one or more embodiments of the disclosure comprising a cloud infrastructure.

FIG. 8 illustrates an exemplary Kubernetes processing platform 800 that may be used to implement at least a portion of one or more embodiments of the disclosure comprising a containerized infrastructure. Generally, Kubernetes is an open-source system for automated deployment, scaling and management of containerized applications across clusters of hosts. Kubernetes supports a number of container tools, including Docker.

As shown in FIG. 8, the exemplary Kubernetes processing platform 800 typically deploys and schedules containers in groups referred to as pods 810-1 through 810-J. An exemplary Kubernetes pod 810 will typically include one to two containers that collaborate to provide a service, in a known manner. The pods 810 may optionally execute on a plurality of nodes 820-1 through 820-K.

Each node 820 further comprises a kubelet 870 that serves as a primary "node agent" running on each node 820. The kubelet 870 works in terms of a PodSpec. A PodSpec is a YAML or JSON (JavaScript Object Notation) object that describes a pod. YAML is a human-readable data serialization language that is often used for configuration file. In one or more embodiments, the kubelet 870 takes a set of PodSpecs that are provided through various mechanisms (primarily through the apiserver 830, discussed below) and ensures that the containers described in those PodSpecs are running and healthy. The kubelet 870 does not manage containers that were not created by Kubernetes.

As shown in FIG. 8, a Kubernetes network proxy 880 also runs on each node 820. The Kubernetes network proxy 880 reflects services as defined in the Kubernetes API on each node and can do TCP (Transmission Control Protocol), UDP (User Datagram Protocol) stream forwarding or round robin TCP, UDP forwarding across a set of backends. The user creates a service with the API of the apiserver 830 to configure the proxy 880.

In addition, Kubernetes defines is a master node 820-Master. As shown in FIG. 8, the master node 820-Master comprises a Kubernetes scheduler 840, a Kubernetes API server (apiserver) 830 and one or more replication controllers 850. Generally, the Kubernetes API server (apiserver) 830 validates and configures data for the API objects that include pods 810, services, replicationcontrollers, and others. The API Server services Representational State Transfer (REST) operations and provides the frontend to the cluster's shared state through which all other components interact.

The Kubernetes scheduler 840 is a topology-aware, workload-specific function that impacts availability, performance, and capacity. The scheduler 840 considers individual and collective resource requirements, quality of service requirements, hardware/software/policy constraints, affinity and anti-affinity specifications, data locality, inter-workload interference and/or deadlines. Workload-specific requirements are optionally exposed through the API, as necessary.

The replication controller 850 instantiates the pods 810. The replication controller 850 controls and monitors the number of running pods 810 for a service, improving fault tolerance. The exemplary Kubernetes processing platform 800 further employs a kubectl interface 860, serving as a command line interface for running commands against Kubernetes clusters, in a known manner.

In one or more embodiments, the exemplary Kubernetes processing platform 800 employs a flat network model and permits all pods 810 to communicate with each other. Containers in the same pod 810 share an IP address and can communicate using ports on the localhost address. In addition, services are endpoints that can be addressed by name and can be connected to pods 810 using label selectors. The service will automatically distribute requests between the pods 810 in a round robin manner. Kubernetes sets up a DNS server for the cluster that watches for new services and allows new services to be addressed by name.

Figure 9:
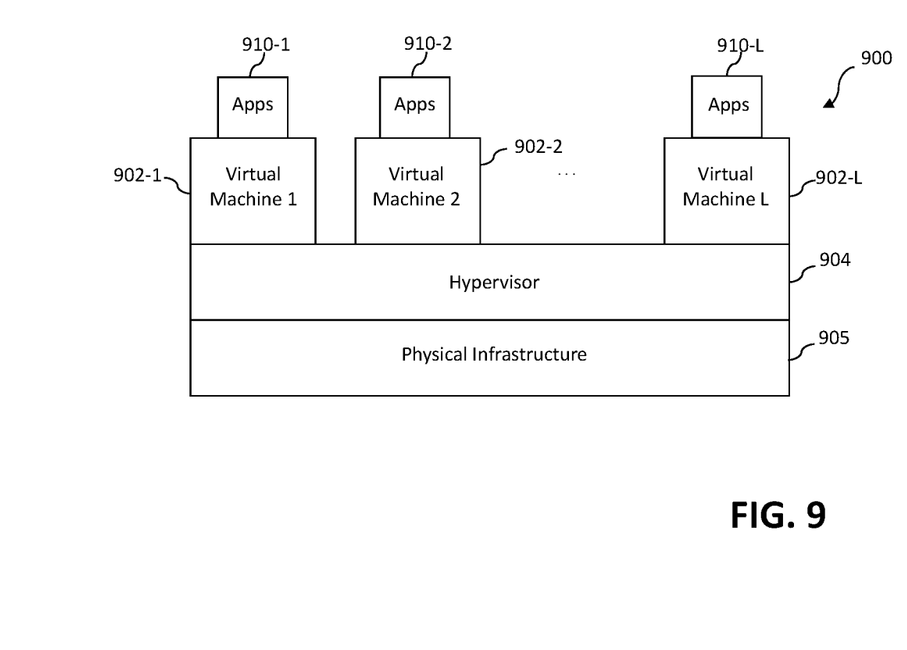
FIG. 9 illustrates an exemplary processing platform that may be used to implement at least a portion of one or more embodiments of the disclosure comprising a cloud infrastructure.

Referring now to FIG. 9, one possible processing platform that may be used to implement at least a portion of one or more embodiments of the disclosure comprises cloud infrastructure 900. The cloud infrastructure 900 in this exemplary processing platform comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

The cloud infrastructure 900 may encompass the entire given system or only portions of that given system, such as one or more of client, servers, controllers, or computing devices in the system.

Although only a single hypervisor 904 is shown in the embodiment of FIG. 9, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 904 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the container life cycle management engine 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed container life cycle management apparatus may each run on a computer, server, storage device or other processing platform element. A given such element may be viewed as an example of what is more generally referred to herein as a "processing device." The cloud infrastructure 000 shown in FIG. 9 may represent at least a portion of one processing platform.

Figure 10:
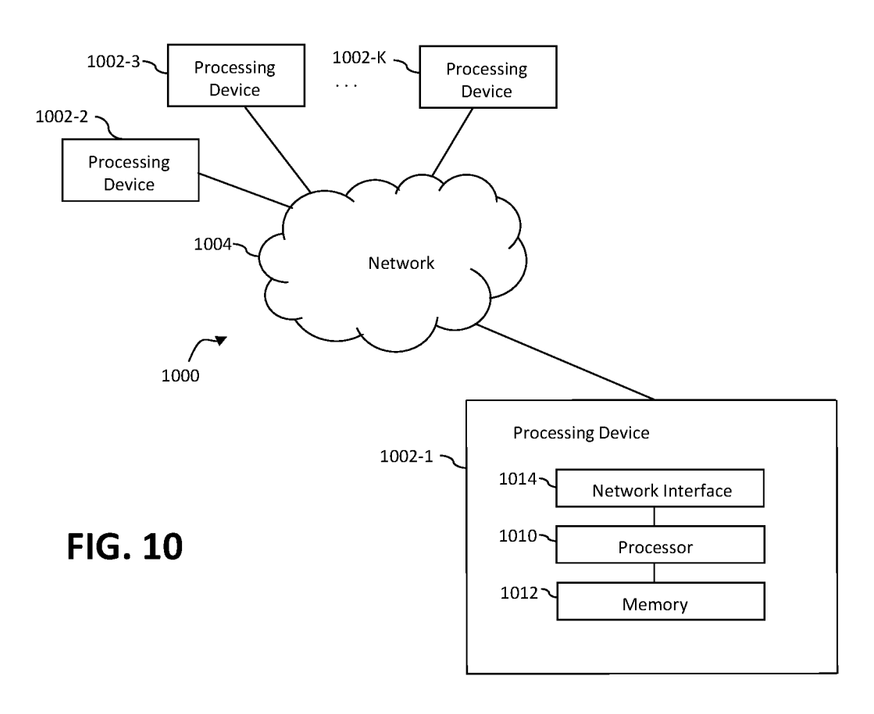
FIG. 10 illustrates another exemplary processing platform that may be used to implement at least a portion of one or more embodiments of the disclosure.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of container life cycle management system 100 may be collectively implemented on a common processing platform of the types shown in FIGS. 8 through 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 4 and 5 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for managing a plurality of containers, comprising:
    determining that a predefined retention time for a first container of the plurality of containers has elapsed;
    in response to the determining that the predefined retention time for the first container of the plurality of containers has elapsed, performing the following honeypot container creation steps, using at least one processing device:
    suspending new session traffic to the first container;
    waiting for a predefined session dilution time before maintaining the first container as a honeypot container; and
    identifying one or more communications sent to the honeypot container as anomalous communications for subsequent analysis.

2. The method of claim 1, wherein said honeypot container creation steps further comprise the step of obtaining a new container to replace the first container using a golden container.

3. The method of claim 2, wherein the first container is associated with a first Internet Protocol (IP) address and a first media access control (MAC) address, and wherein the new container is associated with at least one of a different IP address and a different MAC address.

4. The method of claim 2, wherein the first container and the new container are associated with a same application type.

5. The method of claim 1, wherein said honeypot container creation steps further comprise the step of generating an alert notification of the anomalous communication.

6. The method of claim 1, wherein said step of suspending new session traffic to the first container is performed by a load balancer.

7. The method of claim 1, wherein said honeypot container is maintained for a configurable period of time.

8. A system, comprising:
    a memory; and
    at least one processing device, coupled to the memory, operative to implement the following steps:
    determining that a predefined retention time for a first container of the plurality of containers has elapsed;
    in response to the determining that the predefined retention time for the first container of the plurality of containers has elapsed, performing the following honeypot container creation steps, using said at least one processing device:
    suspending new session traffic to the first container;
    waiting for a predefined session dilution time before maintaining the first container as a honeypot container; and
    identifying one or more communications sent to the honeypot container as anomalous communications for subsequent analysis.

9. The system of claim 8, wherein said honeypot container creation steps further comprise the step of obtaining a new container to replace the first container using a golden container.

10. The system of claim 9, wherein the first container is associated with a first Internet Protocol (IP) address and a first media access control (MAC) address, and wherein the new container is associated with at least one of a different IP address and a different MAC address.

11. The system of claim 9, wherein the first container and the new container are associated with a same application type.

12. The system of claim 8, wherein said honeypot container creation steps further comprise the step of generating an alert notification of the anomalous communication.

13. The system of claim 8, wherein said step of suspending new session traffic to the first container is performed by a load balancer.

14. The system of claim 8, wherein said honeypot container is maintained for a configurable period of time.

15. A computer program product, comprising a non-transitory machine-readable storage medium having encoded therein executable code of one or more software programs, wherein the one or more software programs when executed by at least one processing device perform the following steps:
    determining that a predefined retention time for a first container of the plurality of containers has elapsed;
    in response to the determining that the predefined retention time for the first container of the plurality of containers has elapsed, performing the following honeypot container creation steps, using at least one processing device:
    suspending new session traffic to the first container;
    waiting for a predefined session dilution time before maintaining the first container as a honeypot container; and
    identifying one or more communications sent to the honeypot container as anomalous communications for subsequent analysis.

16. The computer program product of claim 15, wherein said honeypot container creation steps further comprise the step of obtaining a new container to replace the first container using a golden container, wherein the first container is associated with a first Internet Protocol (IP) address and a first media access control (MAC) address, and wherein the new container is associated with at least one of a different IP address and a different MAC address.

17. The computer program product of claim 15, wherein said honeypot container creation steps further comprise the step of generating an alert notification of the anomalous communication.

18. The computer program product of claim 15, wherein said honeypot container is maintained for a configurable period of time.

19. The computer program product of claim 15, wherein said honeypot container creation steps further comprise the step of obtaining a new container to replace the first container using a golden container.

20. The computer program product of claim 15, wherein said step of suspending new session traffic to the first container is performed by a load balancer.

* * * * *